US009154572B2

(12) United States Patent
Thilagar et al.

(10) Patent No.: US 9,154,572 B2
(45) Date of Patent: Oct. 6, 2015

(54) CHANGING I/O TYPES FOR PROCESSING DATA REQUESTS

(75) Inventors: Parthiban Thilagar, Hollis, NH (US); Richard J. Anderson, Jr., Nashua, NH (US); William A. Wright, Bedford, NH (US); Joseph E. Errede, Londonderry, NH (US); Patrick H. Fry, Brookline, NH (US); Raymond L. Pfau, Bolton, MA (US); Fang Chen, San Mateo, CA (US); Shu Ling, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 649 days.

(21) Appl. No.: 12/820,389

(22) Filed: Jun. 22, 2010

(65) Prior Publication Data

US 2011/0314175 A1 Dec. 22, 2011

(51) Int. Cl.
  *G06F 15/16* (2006.01)
  *H04L 29/08* (2006.01)
(52) U.S. Cl.
  CPC .... *H04L 67/2847* (2013.01); *G06F 2213/0038* (2013.01)
(58) Field of Classification Search
  CPC .................................. H04L 29/08045
  USPC ....................................... 709/232
  See application file for complete search history.

(56) References Cited

U.S. PATENT DOCUMENTS

| | | | |
|---|---|---|---|
| 6,678,791 B1 | 1/2004 | Jacobs et al. | |
| 6,732,237 B1 | 5/2004 | Jacobs et al. | |
| 6,785,769 B1 | 8/2004 | Jacobs et al. | |
| 6,789,170 B1 | 9/2004 | Jacobs et al. | |
| 6,799,251 B1 | 9/2004 | Jacobs et al. | |
| 6,934,720 B1 | 8/2005 | Jacobs et al. | |
| 6,973,536 B1 | 12/2005 | Jacobs et al. | |
| 7,076,608 B2 | 7/2006 | Arunagirinathan et al. | |
| 7,089,363 B2 | 8/2006 | Ling et al. | |
| 7,103,714 B1 | 9/2006 | Jacobs et al. | |
| 7,143,244 B2 | 11/2006 | Ling et al. | |
| 2002/0152305 A1* | 10/2002 | Jackson et al. | 709/224 |
| 2003/0046396 A1* | 3/2003 | Richter et al. | 709/226 |
| 2004/0255048 A1* | 12/2004 | Lev Ran et al. | 709/249 |
| 2008/0059621 A1* | 3/2008 | Raghavan et al. | 709/223 |
| 2008/0086516 A1* | 4/2008 | Claborn et al. | 707/202 |

OTHER PUBLICATIONS

M. Tim Jones "Boost application performance using asynchronous I/O", http://www.ibm.com/developerworks/linux/library/l-async/, dated Aug. 29, 2006.*

Alexander Libman with Vladimir Gilbourd "Comparing Two High-Performance I/O Design Patterns", http://www.artima.com/articles/io_design_patternsP.html, dated Nov. 25, 2005.*

(Continued)

*Primary Examiner* — Vivek Srivastava
*Assistant Examiner* — Karina J Garcia-Ching
(74) *Attorney, Agent, or Firm* — Kraguljac Law Group, LLC (57) ABSTRACT

Systems, methodologies, media, and other embodiments associated with processing network communications are described. One embodiment of a method includes processing data requests including changing an input/output (I/O) communications type for processing the data requests.

21 Claims, 5 Drawing Sheets

(56) References Cited

OTHER PUBLICATIONS

Oracle International Corporation; Oracle Web Cache 11g Overview; Sep. 2009; pp. 1-18; Oracle International Corporation, Redwood Shores, CA.

"Caching in on the Enterprise Grid Turbo-Charge Your Applications with OracleAS Web Cache" An Oracle Technical White Paper, Sep. 2005 (34 pgs).

"Oracle Web Tier 11gR1", Oracle, Sep. 2009 (35 pgs).

"8 Simple Caching Rules Web (Caching Your Application for Fast Response Time)", An Oracle White Paper Supplementary to Oracle OpenWorld Technical Session, Dec. 2004 (11 pgs).

"FAQ—Oracle Fusion Middleware", Oracle Application Server 10g Web Cache Frequently Asked Questions, Sep. 2005 (12 pgs).

\* cited by examiner

CHANGING I/O TYPES FOR PROCESSING DATA REQUESTS

BACKGROUND

Delivering web-based documents with optimal performance can be difficult due to highly varying bandwidths and latencies of each network connection.

In computer networking, the term bandwidth refers to the data rate supported by a network connection or interface. Bandwidth can refer to both actual and theoretical throughput. For example, a standard dialup modem supports up to 56 Kbps (kilobits-per-second) of peak bandwidth, but due to physical limitations of telephone lines and other factors, a dialup connection cannot practically support more than 53 Kbps of bandwidth in practice. Likewise, a traditional Ethernet network theoretically supports 100 Mbps (megabits-per-second) of bandwidth, but this maximum throughput cannot reasonably be achieved nor sustained due to overhead in the computer hardware and operating systems, as well as other factors such as hardware switches, bridges and routers. Consequently, networks generally do not operate at the "advertised" bandwidth.

Latency is another element that contributes to overall network speed. The term latency refers to delays that may occur in the processing of network data requests. A low-latency network connection is one that generally experiences small delay times, while a high-latency connection generally suffers long delays. Other than propagation delays, latency may also involve transmission delays (properties of the physical medium) and processing delays, such as passing through proxy servers or making additional network hops on the internet.

Although the theoretical peak bandwidth of a network connection is fixed according to the underlying technology used, the actual bandwidth obtained varies greatly over time and is affected by high latencies. Excessive latency creates bottlenecks that prevent data from saturating the network pipe, thus decreasing the effective bandwidth. The impact of latency on network bandwidth can be temporary (lasting a few seconds) or persistent (constant) depending on the source of the delays.

A cache server can operate as a network acceleration product and may reside in the middle of these propagation latency bottlenecks. In general, the cache server is configured to operate in such ways that it not be the source of additional processing latency. However in practice, the cache server does have processing latencies. More efficient techniques for operating a cache server or other network device may be desired.

BRIEF DESCRIPTION OF THE DRAWINGS

The accompanying drawings, which are incorporated in and constitute a part of the specification, illustrate various example systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments disclosed herein are associated with processing network communications and with cache servers. In one embodiment, a cache server operates to periodically choose an input/output (I/O) type to use when processing data requests. It will be appreciated that the term "periodically," in reference to the selection of an I/O type, includes making such a selection at random times, at pre-designated time intervals, or at times that are based on existing network conditions such as timeouts or changes in performance behavior or other network characteristics. For example, an I/O type may be selected to improve or optimize response times for certain network connections. The selected I/O type may change since every network connection has the potential to possess different performance characteristics based on bandwidth and latency. Typically, there is no single I/O type that works optimally on every network connection at all times.

Changing the I/O type used to process operations allows the cache server to choose the I/O type that improves or optimizes response times for a given network connection bandwidth and latency. In another embodiment, statistical sampling of the network connection performance is collected and used by the cache server to dynamically change I/O types for a particular network connection based at least in part on current operating conditions and workload. For example, a back-end server might be performing very efficiently, such that one particular I/O type performs better than the others. However, if the back-end server suddenly becomes overloaded with requests, the selected I/O type might no longer be the best choice. In this case, the cache server operates to dynamically select another, more appropriate I/O type after an appropriate learning period.

Figure 1:
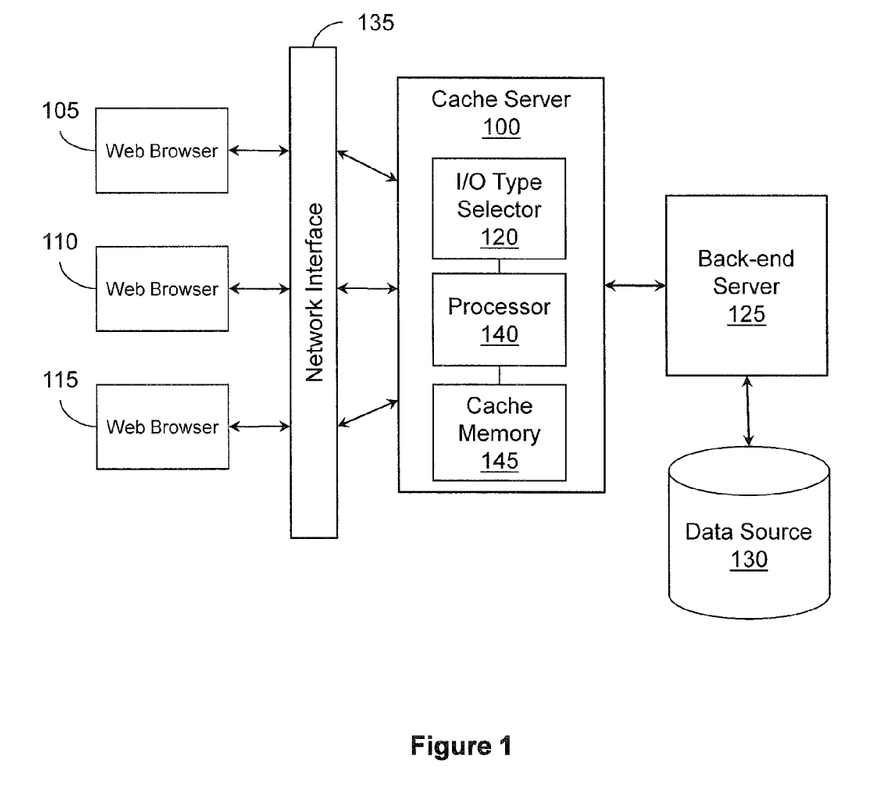
FIG. 1 illustrates one embodiment of a cache server containing an I/O type selector.

FIG. 1 illustrates one embodiment of a cache server 100 that receives incoming data requests from client devices 105, 110, and 115, each of which may contain a web browser or other network communications tool. The cache server 100 includes an input/output (I/O) type selector 120 that selects an I/O type from a plurality of I/O types with which to process the data requests. As will be described in more detail herein, the I/O type selector 120 periodically changes the I/O type used to process requests, which allows the cache server 100 to choose an appropriate I/O type that improves or optimizes response times for a given network connection with one of the client devices 105, 110, 115. In another embodiment, multiple cache servers could be clustered or set up independently. In terms of a communication path or network, the cache server 100 is located in front of a back-end server 125, and back-end server 125 is located in front of a data source 130 (e.g., database, flat files, stored web pages, etc.). Alternatively, cache server 100 could be located in front of the data source 130 and in back of the back-end server 125. The particular network configuration of the cache server 100, the back-end server 125 and the data source 130 does not affect the operation of I/O type selector 120.

In one embodiment, the cache server 100 is a computing device that includes at least one network interface 135 for communicating between a plurality of client devices (e.g. client devices 105, 110, and 115), the at least one data source 130, and/or other network device. In some embodiments the data source 130 is remote. The cache server 100 also includes at least one processor 140 for processing the data requests received from the plurality of clients and performing other data processing functions. The data requests typically may include requests for data that reside (or are believed to reside) in the data source 130.

At least one cache memory 145 is used by the processor 140 to locally store selected data that has been retrieved from the data source 130. The I/O type selector 120 selects an I/O communications type from a plurality of I/O communications types for processing one or more of the data requests, and periodically examines and/or validates and changes the selected I/O communications type for different data requests.

In another embodiment, the I/O type selector 120 is configured to periodically change the I/O communications type used to process the data requests based at least in part on response time characteristics collected from previously processed data requests. In this manner, the cache server 100 applies different I/O types for different data requests and/or different network connections to attempt to improve or optimize the response times for individual data requests or groups of data requests.

Figure 2:
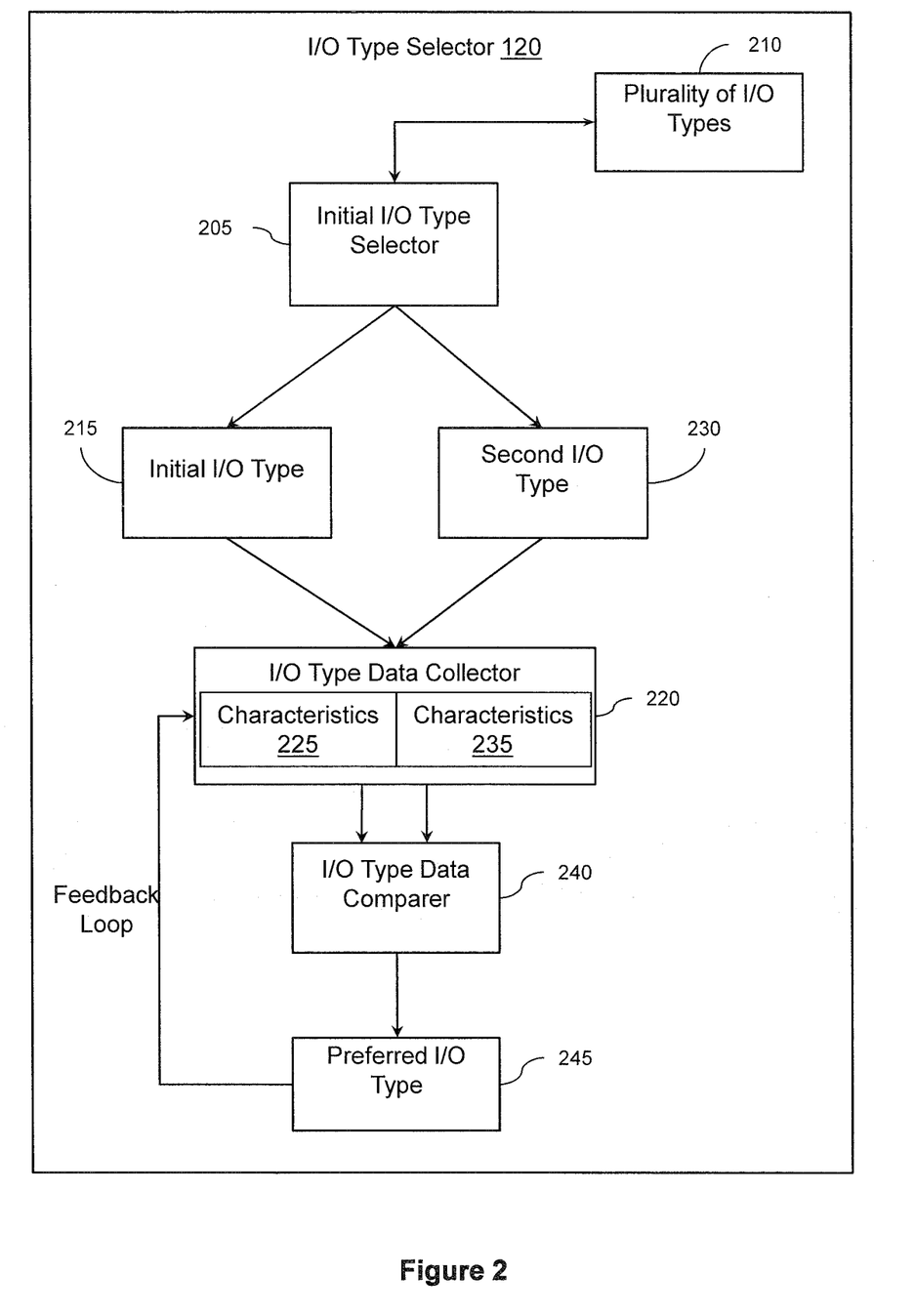
FIG. 2 illustrates one embodiment of an I/O type selector.

FIG. 2 illustrates one embodiment of the I/O type selector 120 from FIG. 1. In the embodiment shown in FIG. 2, the I/O type selector 120 contains an I/O type selector 205 which selects a single initial I/O type 215 from a plurality of I/O types 210. The I/O type selector 205 can be configured to select an I/O type randomly, or deterministically based on a predetermined sequence, set or rules, and so on. For example, the I/O types may include a synchronous I/O type, a non-blocking I/O type, an asynchronous I/O type, and so on. These types are described in more detail below. It is presumed that the cache server 100 is configured with appropriate logic to implement the various I/O communications types. The I/O types that are implemented become the available types for selection by the I/O type selector 120. In another embodiment, the I/O type selector 205 is configured to select an initial I/O type 215 as a default.

Once the I/O type selector 205 selects the initial I/O type 215 for processing a data request, the I/O type data collector 220 collects response data characteristics 225 associated with using the selected I/O type 215. For example, the characteristics 225 may include time for a data request to be processed and a time for the corresponding data to be returned to the client device 105. Periodically, the I/O type selector 205 selects a second I/O type 230 from the plurality of I/O types 210 to process subsequent data requests. Response data characteristics 235 corresponding to the second I/O type 230 are then collected and transmitted to the I/O type data collector 220. In some embodiments, the second I/O type 230 may be the same as the initial I/O type 215.

In one embodiment, the I/O type data collector 220 may transmit the response data characteristics 225, 235 to an I/O type data comparer 240, which compares the response data characteristics 225, 235 of the I/O types that were used. The I/O type data comparer 240 then identifies a preferred I/O type 245 that has optimal or improved response data characteristics between the two I/O types. The cache server 100 (shown in FIG. 1) then uses the preferred I/O type 245 for processing the next one or more data requests. The preferred I/O type 245 may be used until the I/O type data comparer 240 identifies another I/O type that has improved response time characteristics. An improved I/O type may be identified by comparing the response data characteristics of the preferred I/O type 245 against the response data characteristics of another I/O type that is selected by the I/O type selector 205. As noted above, the I/O type may be selected from the plurality of I/O types 210 randomly, or deterministically based on a predetermined sequence or set of rules. In some embodiments, the initial I/O type 215 may be identified as the preferred I/O type 245.

Figure 3:
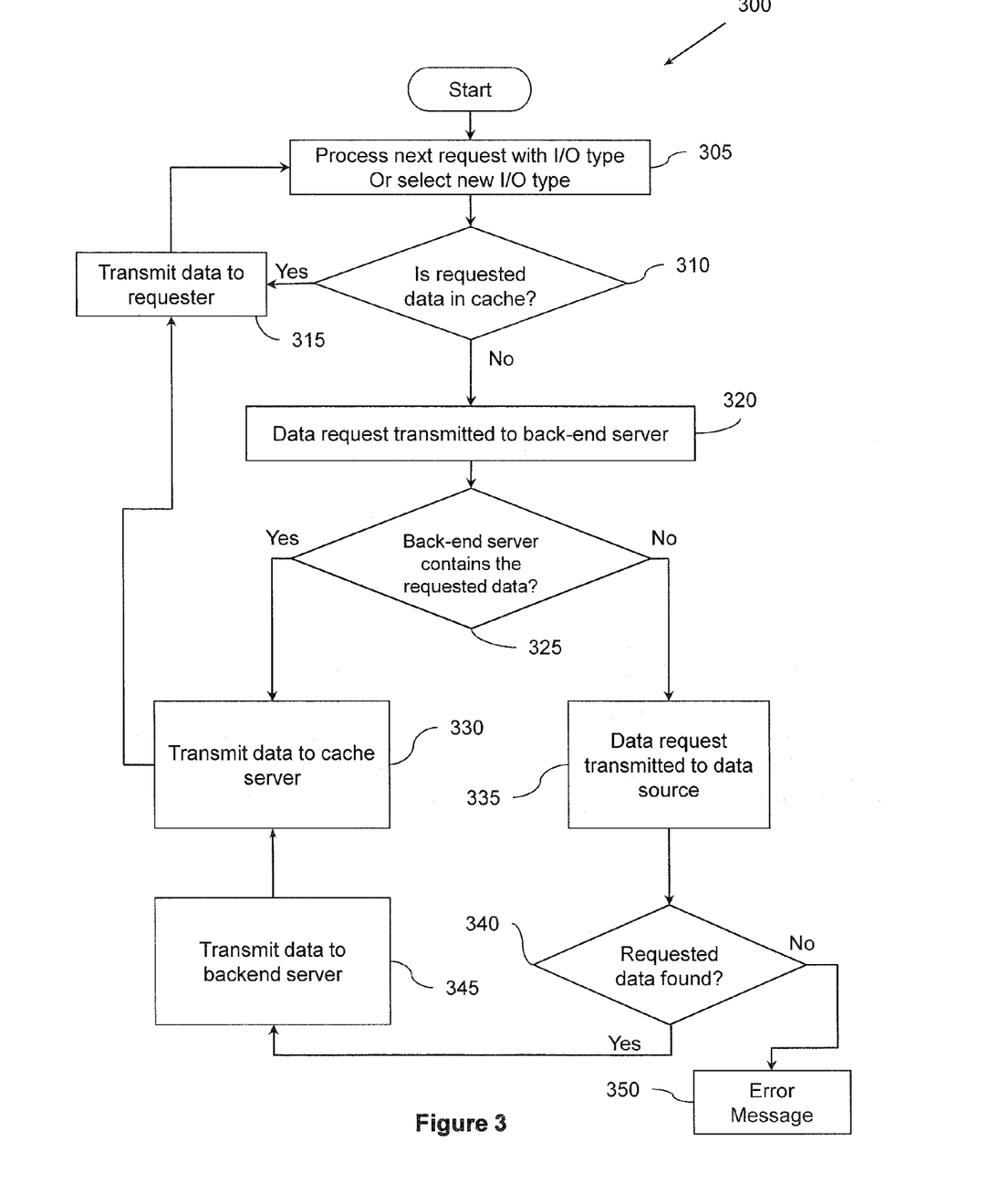
FIG. 3 illustrates one embodiment of a data request process flow.

FIG. 3 illustrates one embodiment of a method 300 for processing a data request, based on the cache server 100 configuration illustrated in FIG. 1. Suppose that the cache server 100 receives a data request from a client (e.g. client device 105) that is requesting data from a data source. The method 300 is initiated and the cache server 100 processes the data request. At 305, the data request is processed by the cache server 100 with the currently selected I/O type or a new I/O type is selected from the plurality of available I/O types. Once selected, network communications from the cache server are performed using the selected I/O type. At 310, the cache server 100 checks its local memory (e.g. cache memory 145) to determine if the requested data has been previously retrieved. If the requested data resides in the cache memory 145, then at 315, the cache server 100 returns the requested data to client device 105 and the request is satisfied. If the requested data does not reside in the cache memory 145, then at 320, the cache server 100 transmits the data request to the back-end server 125 to locate the requested data. As previously stated, this transmission is performed in accordance with the selected I/O type.

The back-end server 125 then processes the data request. At 325, if the requested data resides in the local memory of back-end server 125, then at 330, back-end server 125 returns the requested data to cache server 100, which in turn returns the requested data to the requester at 315. Cache server 100 may also determine whether the requested data should be cached locally for future data requests. At 325, if the requested data does not reside on the back-end server 125, then at 335 the back-end server 125 transmits the data request to the data source 130.

Upon receiving the data request, the data source 130 processes the data request and attempts to retrieve the requested data. At 340, if the requested data resides on the data source 130, then at 345, the data source 130 returns the requested data to back-end server 125, which in turn transmits the requested data to the cache server 100 at 330, which returns the requested data to the client device 105 at 315. Since this action is performed by the cache server 100, the selected I/O type is used to communicate the data over the network. In an alternative embodiment, the data source 130 may transmit the requested data directly to the cache server 100. The cache server 100 may also determine whether the requested data should be cached for future data requests. Returning to block 340, if the requested data does not reside on the data source 130, then at 350, a message may be returned to the client device 105 indicting that the data is not available.

Figure 4:
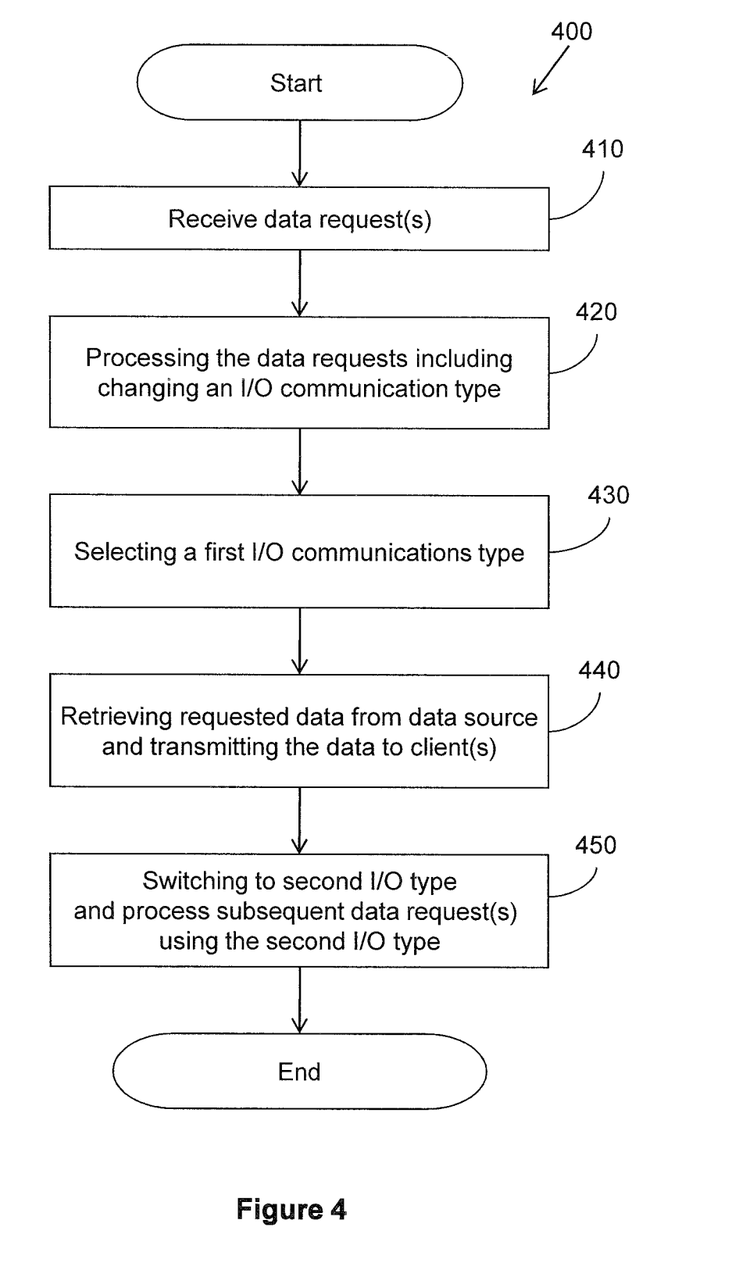
FIG. 4 illustrates one embodiment of a method associated with changing I/O types.

With reference to FIG. 4, one embodiment of a method 400 is shown associated with block 305 from FIG. 3. In general, the method 400 periodically changes the I/O type used for communicating and processing a particular data request(s). At 410, one or more data requests are received, for example by the cache server 100, from a plurality of requesting clients. The data requests include a request to access data that is located in a data source. At 420, the data requests are processed which includes changing an I/O communications type for communicating and processing the data requests so that the data requested by the data requests can be retrieved and delivered to the requesting device.

At 430, a first I/O communications type is selected from a plurality of I/O communications types to process the data requests (as previously explained). At 440, data from the data source is retrieved that satisfies the data request and the data is transmitted to the requesting client using the first I/O communications type. Of course, if the requested data is found in the local cache of the cache server, the data need not be retrieved from the data source. At 450, a second I/O communications type is determined and selected from the plurality of I/O types and subsequent data requests are then communicated and processed using the second I/O communications type; i.e., the first I/O communications type is switched to the second I/O communications type. As previously explained, periodically changing the I/O type used for communications may improve response times for different data requests rather than using the same I/O type for all requests.

In another embodiment, method 400 may include collecting response time characteristics that apply to the first I/O communications type and/or the second I/O communications type. Then a statistical analysis is performed to determine which I/O type performs better. For example, response time characteristics can be assessed for the second I/O communications type when it is used to process the data requests and this is compared to the response time characteristics of the first I/O communications type. The second I/O communications type is then set as the communications method to use for processing subsequent data requests based on improved response time characteristics (e.g. the second type performs better than the first type under current network conditions).

For example, a sampling of one or more response time characteristics are collected and determined for a particular point in time. For example, response time characteristics and performance characteristics may include data, performance behavior and other conditions that can be sampled. Based on the response time characteristics, the first I/O type is selected from a plurality of available I/O types. In one embodiment, an I/O type is a communication method used to communicate transactions involved in processing the data requests over communication channels between the cache server and other network devices. When the response time characteristics change, the characteristics can be re-evaluated and a different I/O type may be selected in order to improve the response time for a data request or to avoid the response time from increasing. In one embodiment, the I/O type may be determined and selected for an individual data request or for a group of data requests. As such, the process can dynamically change the I/O types used for communicating different data requests rather than using the same I/O type for all data requests.

In one embodiment, the plurality of I/O types may include a synchronous I/O type, a non-blocking I/O type, and an asynchronous I/O type. Of course, other I/O types may be available for selection depending on which types are implemented in a computing device. Each I/O type has its own performance characteristics and manner of processing communications. For example, the Synchronous I/O Type starts an I/O operation and then synchronously waits for the I/O operation to be completed before beginning to execute a second I/O operation. Such an approach blocks the execution thread of the server while the communication or operation is in progress, leaving system resources idle. When a server executes many synchronous I/O operations, this could result in the CPU spending almost all of its idle time waiting for I/O operations to be completed. On some systems, the synchronous I/O type can yield response time characteristics that can vary in duration.

The Non-Blocking I/O Type is a variation of the synchronous I/O type. The non-blocking I/O type will start an I/O operation if the operating system determines the I/O can be immediately completed; conversely, an I/O operation that cannot be immediately completed will not be started. This allows the server to reschedule an I/O operation that cannot be immediately completed for a later time and perform other processing activities in the meantime. For purposes of explanation, this type is called the "Fast Path" I/O type in diagrams and state machine discussions.

The Asynchronous I/O Type starts an I/O operation, but allows the server to perform processing operations that are not predicated on the I/O operation being completed. Accordingly, any task that depends on the I/O operation being completed will need to wait until the I/O operation is completed, and thus is still blocked, but other processing operations which do not have such a dependency can continue concurrently.

Superficially, it would appear that the asynchronous I/O type should always be used and that the synchronous I/O type should never be used. However, this is not necessarily the case. For instance, the asynchronous I/O type uses additional resources to schedule the I/O operation and "remember" that the I/O operation is in-progress. Furthermore, the server uses a separate mechanism to check on the status of the I/O operation. In some cases, the overhead associated with managing and servicing the asynchronous I/O operation causes the response time to actually be longer than using other I/O types.

Accordingly, determining performance characteristics for current conditions associated with the cache server and/or network becomes useful for dynamically selecting different I/O types to process different data requests and/or to select different I/O types for different network connections.

As another example, some client connections are forwarded from load-balance routers operating in a local-area network. In these cases, the client connection has a very large bandwidth, and it might be advantageous to perform a synchronous read I/O operation. However, if the client connection is from a mobile network device, the bandwidth might be so low that an asynchronous read or write I/O operation might be better.

When considering a cache server network topology, the cache server receives tasks from "front-end" clients and distributes those tasks to various "back-end" servers for processing. In this architecture, a front-end client requests data content and the back-end server provides the data content that may be cached for future use by the cache server.

Back-end server connections are typically located in a geographically close environment, usually connected by a local-area network with large bandwidth. However, the server latency might be very high due to the large amount of processing required to service the request, or the request may represent a very large amount of data. In other cases, the server request might be serviced very quickly because it represents very little data.

The ability to perform and change network I/O operations in reaction to dynamic changes in the operating environment may result in system efficiencies in responding to customer requests and reducing response times. More consistent response times in varying operating environments may also result in more requests that can be serviced in a timely manner.

In one embodiment, a "learning" period is used during which each I/O type performance is sampled for a fixed period of time, or until "steady state" performance is achieved. The learning period can be dynamically adjusted either longer or shorter, depending on the data collection trend. For example, if steady state can be achieved in five seconds, the learning period does not need to be fifteen seconds. Conversely, if the steady state cannot be achieved within the designated learning period, then next time the learning period can be lengthened.

In one embodiment, a method is described to change I/O types that are used in network connections, and/or statistically determine an improved or optimal I/O type to use for each network connection based at least in part on request response time (e.g. round-trip time). The data collected may include a running average of the total round trip time, which represents connection response time. For front-end connections, in one example, the round-trip time is calculated as the duration from the start of a network "receive" operation (e.g. the request) until the completion of the network "send" operation (e.g. the response). For back-end connections, the round-trip time is calculated as the duration from the start of the network send operation (e.g. the request) until the completion of the network receive operation (e.g. the response).

In the case where a requested document is not currently residing in the cache server, the front-end request response time calculation also includes the back-end response time calculation (e.g. time to retrieve the document from a back-end server). This is another consideration that affects network latency. Cached documents can have a considerably shorter response time than documents that are not cached. Additionally, in some instances, several network I/O operations may be performed to satisfy an originating request. For example, a client request for a very large document might perform one "send" operation but hundreds of network "receive" operations to obtain the entire document from the back-end server.

In another embodiment, on a per-connection basis, the cache server 100 is configured to compute a response time, based on network bandwidth and processing latency, used to satisfy the request, based on different available I/O types. Due to portability considerations, not all I/O types may be available on all hardware platforms. A running average of response times for each I/O type for each connection type is collected. The cache server may then determine the most likely I/O type that provides improved response time characteristics based at least in part on the running averages.

In another embodiment, some network connections may be so short-lived that accurate statistical data collection is not possible. However, the HTTP/1.1 protocol defines semantics for an optional connection keep-alive threshold, which specifies the amount of time a connection is to be kept active. In one embodiment, the cache server 100 is implemented with this keep-alive mechanism (or similar mechanism) so that a given connection can be maintained and hopefully re-used with the result that more accurate data collection is achieved.

In another embodiment, each network connection is monitored and regularly evaluated to determine the optimal network I/O type for that connection's current operating characteristics. With this process, improved response times may be achieved as compared to simply selecting one I/O type and using that type for every connection in all situations. In another embodiment, fluctuations in performance characteristics for each connection are detected and handled in order to optimize response-time characteristics in changing operating environments.

Figure 5:
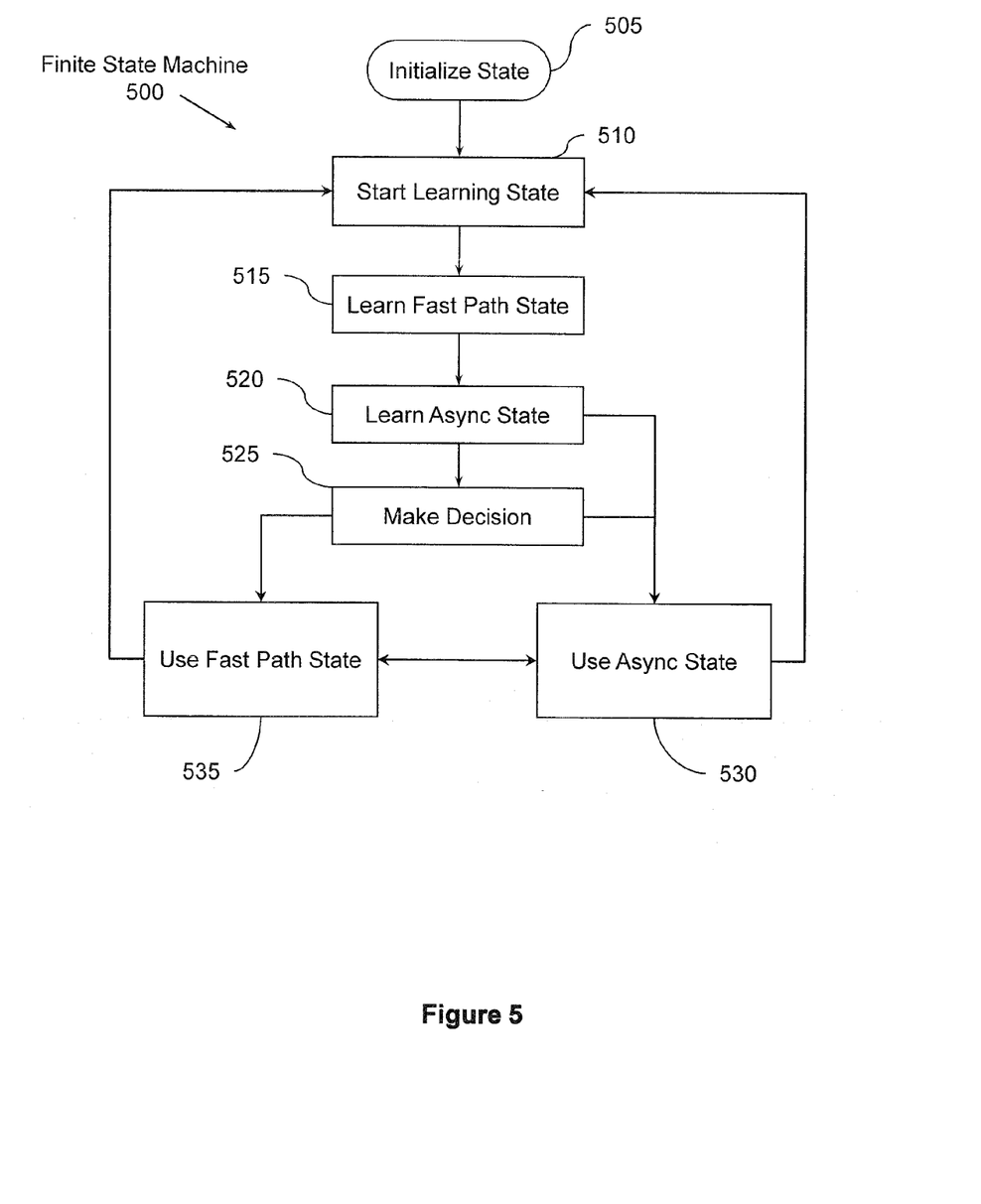
FIG. 5 illustrates one embodiment of a finite state machine for the I/O type selector.

With reference to FIG. 5, one embodiment of a process flow chart is illustrated, structured as a finite state machine 500, of the actions taken by the I/O type selector 120 in one embodiment. Once the cache server receives the data request, the I/O type selector 120 enters an "Initialize" state 505, in which the data collection structures are created. In one embodiment, this state is executed once per connection. Once the data collection structures have been created, the finite state machine transitions to a "StartLearning" state 510, in which the data collection structures are initialized (or re-initialized). Response-time data is then collected using various I/O types. This state may be executed multiple times. In one embodiment, once the learning-specific collection structures have been initialized, the finite state machine transitions to a "LearnFastPath" state 515, and the system "learns" response-time information using a non-blocking I/O type.

Once the non-blocking I/O type has reached steady-state, or the learning period has expired, the state machine transitions to a "LearnAsync" state 520. In this state, the finite state machine collects response-time information using asynchronous I/O type.

Once the asynchronous I/O type has reached steady-state, or in another embodiment, once the learning period has expired, the finite state machine 500 transitions to a "MakeDecision" state 525. In the MakeDecision state 525, the finite state machine 500 compares the response-time data collected in the LearnFastPath state 515 and the LearnAsynch state 520, and selects the I/O type that has the fastest response times for subsequent operations. Once the asynchronous I/O type has a faster response time than the non-blocking I/O type, the state machine transitions to the UseAsync state 530.

If the Fast Path I/O type possesses the fastest response-time characteristics, then the finite state machine 500 transitions to the "UseFastPath" state 535, in which response-time information using a non-blocking I/O type is used. Similarly, if the asynchronous I/O type is found to have better response-time characteristics than those of the non-blocking I/O type, then the finite state machine 500 transitions to the "UseAsynch" state 530, in which response-time information using the asynchronous I/O type is used. If the asynchronous I/O type performance characteristics drop below that of the last recorded non-blocking I/O type performance characteristics, then the finite state machine 500 transitions to the UseFastPath state 535. If either the asynchronous or non-blocking I/O type exhibits abnormal performance fluctuations (higher or lower), then the finite state machine 500 transitions to the StartLearning state 510.

Once the data for each I/O operation has been collected, a decision can be made about which I/O type provides the best response time for that particular network connection. It may not always be possible to make a decision based on the collected data; sometimes the different I/O types perform similarly. In instances where insufficient data has been collected to identify which I/O type provides better performance characteristics for this connection, then the finite state machine 500 transitions back to the StartLearning state 510 to collect more data.

Once a particular I/O type has been selected, then subsequent network operations use the selected I/O type. However, data collection continues and if a change in established performance is detected, the system will revert to the learning mode in order to re-evaluate the previous decision based at least in part on the current performance characteristics.

In some embodiments, the disclosed methods and their equivalents may be embodied in a non-transitory computer readable storage medium having executable instructions stored therein that, when executed, cause a computer to perform the associated method.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure and claims are not limited to the specific details, the representative apparatus, and illustrative examples shown and described. Thus, the disclosure and claims are intended to embrace alterations, modifications, and variations that can be understood by those of ordinary skill in the art after reading the disclosure.

To the extent that the term "includes" or "including" is employed in the detailed description or the claims, it is intended to be inclusive in a manner similar to the term "comprising" as that term is interpreted when employed as a transitional word in a claim.

What is claimed is:

1. A server computing device comprising:
   at least one network interface for at least communicating between the computing device and a plurality of client devices and between the computing device and at least one data source;
   at least one processor for at least processing data requests received from the plurality of client devices, where the data requests include requests for data from the at least one data source;
   at least one cache memory for storing selected data retrieved from the at least one data source; and
   an input/output (I/O) type selector for selecting an I/O communications type from a plurality of I/O communications types for processing one or more of the data requests, and periodically changing the selected I/O communications type to a different I/O communications type from the plurality of I/O communications types for different data requests by:
      computing a response time used to satisfy the data requests based on the plurality of I/O communication types that are available;
      collecting a running average of response times for the plurality of I/O communication types for network connection types with one or more of the client devices; and
      determining an I/O communications type that provides a lower response time than the selected I/O communications type based at least in part on the collected running averages.

2. The server computing device according to claim 1, wherein the I/O type selector is configured to:
   select a first I/O communications type from the plurality of I/O communications types to process a data request, where the at least one processor causes the server computing device to retrieve the data from the at least one data source and transmit the data to a requesting client using the first I/O communications type selected; and
   select a second I/O communications type from the plurality of I/O communications types, and cause the server computing device to process subsequent data requests using the second I/O communications type.

3. The server computing device according to claim 1, wherein the I/O type selector is configured to periodically change the I/O communications type used to process the data requests based at least in part on comparisons of response time characteristics to each other which are collected for each of the I/O communication types as used with different network connections.

4. A method, comprising:
   receiving data requests, by a cache server, from a plurality of client devices, where the data requests include a request to access data from a data source;
   processing the data requests, with at least a processor in the cache server, including changing an I/O communications type for processing the data requests to deliver the data requested by the data requests;
   selecting a first I/O communications type from a plurality of I/O communications types to process the data requests;
   retrieving the data from the data source and transmitting the data to a requesting client using the first I/O communications type; and
   switching from the first I/O communications type to a second I/O communications type from the plurality of I/O communication types for a different network connection between the cache server and one or more of the client devices, and processing subsequent data requests using the second I/O communications type;
   wherein the switching comprises:
   computing a response time used to satisfy the data requests based on the plurality of I/O communications types that are available;
   collecting a running average of response times for the plurality of I/O communications types for network connection types with one or more of the client devices; and
   determining an I/O communications type as the second I/O communication type from the plurality of I/O communications types that provides a lower response time than the first I/O communications type based at least in part on the collected running averages.

5. The method according to claim 4, further comprising collecting response time characteristics that apply to the first I/O communications type; and
   statistically determining the second I/O communications type by assessing response time characteristics to process the data requests as compared to the first I/O communications type, and setting the second I/O communications type for processing subsequent data requests based on the comparison of the response time characteristics.

6. A method comprising:
   receiving data requests, by a cache server, from a plurality of client devices, where the data requests include a request to access data from a data source;
   processing the data requests, with at least a processor in the cache server, including changing an I/O communications type for processing the data requests to deliver the data requested by the data requests;
   selecting a first I/O communications type from a plurality of I/O communications types to process the data requests;
   retrieving the data from the data source and transmitting the data to a requesting client using the first I/O communications type; and
   switching from the first I/O communications type to a second I/O communications type from the plurality of I/O communication types for a different network connection between the cache server and one or more of the client devices wherein a different I/O communication type is selected for different network connections from different client devices, and processing subsequent data requests using the second I/O communications type;
   wherein the switching comprises:
   selecting the first I/O communications type for use with a first network connection with a first client device and switching to the second I/O communications type for use with a second network connection with a second client device;

wherein switching to the second I/O communications type comprises:

computing a response time used to satisfy the data requests based on the plurality of I/O communications types that are available;

collecting a running average of response times for the plurality of I/O communications types for network connection types with one or more of the client devices; and determining an I/O communications type as the second I/O communication type from the plurality of I/O communications types that provides a lower response time than the first I/O communications type based at least in part on the collected running averages.

7. The method according to claim 6, wherein the first I/O communications type is selected from a synchronous I/O type, a non-blocking I/O type or an asynchronous I/O type.

8. The method according to claim 4, further comprising collecting an average of response time characteristics for each of the plurality of I/O communication types when used with different network connection types including collecting information on an amount of time spent by the cache server to process the data request.

9. The method according to claim 8, wherein the collecting is based at least in part on round trip time from a start of a network receive operation until completion of a network send operation for front-end connections, or round trip time from a start of the network send operation until completion of the network receive operation for backend connections.

10. The method according to claim 7, wherein other I/O communication types are selected and response time characteristics are compared to the response time characteristics of the second I/O communications type and resetting the second I/O communications type to a third I/O communications type based at least in part on the compared response time characteristics.

11. The method according to claim 5, wherein the statistically determining includes using a finite state machine.

12. The method according to claim 11, further including initializing data collection and computing the response time characteristics using the finite state machine.

13. A non-transitory computer readable medium having executable instructions stored therein that, when executed, cause a computer that includes at least a processor to perform a method, the executable instructions comprising instructions for:

selecting a first I/O (input/output) communication type from a plurality of I/O communication types and collecting, by at least the processor, first response time characteristics from using the first I/O communication type for communications between a cache server and a data source;

selecting a second I/O communication type from the plurality of I/O communication types and collecting, by at least the processor, second response time characteristics from using the second I/O communication type for communications between the cache server and the data source;

processing requests for data from the data source by using an assigned I/O communication type that is selected from the first or second I/O communication types based at least in part on the first and second response time characteristics, wherein the requests for data are received from one or more client devices that request data over network connections to the cache server; and periodically changing the assigned I/O communication type between at least the first and second I/O communication types for processing subsequent requests for data based at least in part (i) on comparing the first and second response time characteristics and (ii) on a network connection between the cache server and the one or more client devices that request the data, wherein a different I/O communication type is selected for different network connections from different client devices;

wherein collecting the first response time characteristics and the second response time characteristics comprise:

computing a response time used to satisfy the data requests based on the plurality of I/O communications types that are available; and collecting a running average of response times for the plurality of I/O communication types for network connection types with one or more of the client devices; and wherein the periodically changing includes selecting the assigned I/O communication type from the plurality of I/O communication types that provides a lower response time than the first I/O communication type or the second I/O communication type based at least in part on the collected running averages.

14. The non-transitory computer readable medium according to claim 13, wherein the instructions for periodically changing comprises instructions for changing the assigned I/O communication type at random times or at pre-designated time intervals.

15. The non-transitory computer readable medium according to claim 13, wherein the instructions for periodically changing the assigned I/O communication type comprises instructions for selecting the assigned I/O communication type from a synchronous I/O communication type, a non-blocking I/O communication type or an asynchronous I/O communication type.

16. The non-transitory computer readable medium according to claim 13, further comprising instructions for determining the response time characteristics from information on an amount of time used for the cache server to process the data request, based on round trip time from a start of a network receive operation until completion of a network send operation for front-end connections, or a round trip time from the start of a network send operation until completion of a network receive operation for backend connections.

17. The non-transitory computer readable medium according to claim 13, further comprising instructions for collecting and comparing the response time characteristics for additional I/O communication types to the response time characteristics of the second I/O communication type and where the computer readable storage medium includes instructions for resetting the second I/O communication type to a third I/O communication type based on the comparisons.

18. The non-transitory computer readable medium according to claim 13, further comprising instructions for using a finite state machine to initialize data collection of the response time characteristics for the plurality of I/O communication types and to decide which I/O communication type to use as the assigned I/O communication type.

19. The non-transitory computer readable medium according to claim 13, wherein the instructions for periodically changing comprises instructions for processing a first group of data requests using the first I/O communication type and upon completion of the first group of data requests, dynamically changing to the second I/O communication type and processing the second group of data requests using the second I/O communication type.

20. The method according to claim 4, wherein the first I/O communications type is selected from a synchronous I/O communication type, a non-blocking I/O communication type or an asynchronous I/O communication type.

21. A method, comprising:
- receiving data requests, by a cache server, from a plurality of client devices over network connections, where the data requests include a request for data;
- processing the data requests, with at least a processor in the cache server, and returning the data requested by the data requests to a requesting client device, wherein the processing includes using a first I/O communications type from a plurality of I/O communication types; and
- switching from the first I/O communications type to a second I/O communications type from the plurality of I/O communication types for a different network connection between the cache server and one or more of the client devices, wherein the switching is performed at random times or at pre-designated time intervals;
- wherein the switching comprises:
- computing a response time used to satisfy the data requests based on the plurality of I/O communications types that are available;
- collecting a running average of response times for the plurality of I/O communications types for network connection types with one or more of the client devices; and
- determining an I/O communications type as the second I/O communications type from the plurality of I/O communications types that provides a lower response time than the first I/O communication type based at least in part on the collected running averages.

* * * * *